United States Patent [19]
Altenberg

[11] Patent Number: 6,096,416
[45] Date of Patent: Aug. 1, 2000

[54] METAL SANDWICH PANELS

[76] Inventor: Milton J. Altenberg, 5302 Mount Bonnell Rd., Austin, Tex. 78731-4608

[21] Appl. No.: 09/104,411

[22] Filed: Jun. 25, 1998

Related U.S. Application Data

[60] Provisional application No. 60/050,900, Jun. 26, 1997.

[51] Int. Cl.⁷ .............................. B32B 5/18; B32B 7/12; B32B 31/12
[52] U.S. Cl. .................. 428/317.7; 52/309.4; 52/309.5; 52/309.9; 156/78; 156/79; 428/317.1; 428/319.1
[58] Field of Search .............................. 428/317.1, 317.7, 428/319.1, 215; 156/78, 79

[56] References Cited

U.S. PATENT DOCUMENTS

| | | | |
|---|---|---|---|
| Re. 30,984 | 6/1982 | Hipchen et al. | 428/297 |
| 3,255,069 | 6/1966 | Crowley et al. | 428/317.7 |
| 3,496,058 | 2/1970 | Schroter et al. | 428/319.1 X |
| 3,814,659 | 6/1974 | Nadeau | 428/319.1 X |
| 4,221,835 | 9/1980 | Severus-Laubenfeld | 428/215 |
| 4,284,674 | 8/1981 | Sheptak | 428/69 |
| 4,284,683 | 8/1981 | Hipchen et al. | 428/285 |
| 4,311,801 | 1/1982 | Skowronski et al. | 428/319.1 X |
| 4,346,133 | 8/1982 | Hipchen et al. | 428/109 |
| 4,386,983 | 6/1983 | Hipchen et al | 156/79 |
| 4,438,166 | 3/1984 | Gluck et al. | 428/319.1 X |
| 4,695,494 | 9/1987 | Fowler, Jr. et al. | 428/71 |
| 4,879,164 | 11/1989 | Younes | 428/209 |
| 4,886,700 | 12/1989 | Younes | 428/252 |
| 4,965,038 | 10/1990 | Younes | 264/552 |
| 5,578,652 | 11/1996 | Blanpied et al. | 521/107 |
| 5,612,111 | 3/1997 | Lin | 428/71 |
| 5,678,369 | 10/1997 | Ishikawa et al. | 52/309.9 |
| 5,735,092 | 4/1998 | Clayton et al. | 52/309.9 |

FOREIGN PATENT DOCUMENTS

| | | |
|---|---|---|
| 0729999 | 9/1996 | European Pat. Off. . |
| 0730000 | 9/1996 | European Pat. Off. . |
| 7118435 | 5/1995 | Japan . |
| 1478692 | 7/1977 | United Kingdom ................ 428/319.1 |

OTHER PUBLICATIONS

"Alternatives to Chlorofluorocarbons", Product Bulletin, DuPont Chemicals, Jan. 1992.

"Hennecke: Polyurethan–Anlangentechnik", Product Bulletin, Maschinenfabrik Hennecke GmbH, Aug. 1992.

"Versawall® /Versapanel®", Product Bulletin, Robertson/United Dominion, 1993.

"Architectural Specifications", Product Bulletin, Lamtec Corporation, Mar. 1995.

"Product Specifications", Product Bulletin, NCI Building Components, Jun. 1995.

"Plastics Machinery Technology", Product Bulletin, Krauss–Maffei, Sep. 1995.

"Lamtec Quality Products", Various Product Bulletin Sheets, Lamtec Corporation, Various dates, Oct. 1995–Mar. 1996.

R. C. Schroter, "Preventing Leaks in Metal Roofing", Simpson Gumpertz & Heger, Inc., 1996.

"Metal Roofing Systems", Product Bulletin, AEP Span, 1996.

D. W. Krassowski, et al., "Expandable Graphite Flake as an Additive for a New Flame Retardant Resin," UCAR Carbon Company, Inc. and Georgia–Pacific Resins, Inc., 1996.

"UCAR GRAFGuard™", Product Bulletin, UCAR Carbon Company, Inc., Oct. 1996.

(List continued on next page.)

Primary Examiner—Richard D. Lovering
Attorney, Agent, or Firm—Madan, Mossman & Sriram, P.C.

[57] ABSTRACT

It has been discovered that improved poured-in-place sandwich panels may be made which have a planar, rigid, cellular polyisocyanurate or polyurethane foam core, an interior facer on one side of the polyisocyanurate foam core and a metal skin on the other, opposite side of the polyisocyanurate foam core. Adhesion of the metal skin to the polyisocyanurate or polyurethane foam core is improved through the use of a primer layer, such as a polyurea or a polyepoxide. Preferably, glass fibers are provided in the polyisocyanurate or polyurethane foam core as reinforcement and as fire retardant.

15 Claims, 5 Drawing Sheets

OTHER PUBLICATIONS

B. Miller, "Intumescents, FR Efficiency Pace Flame Retardant Gains", *Plastics World*, Dec. 1996.

"Continuous Strand Mat Unifilo® 816", Product Bulletin, Vetrotex CertainTeed, Uncertain date.

"Aluminum Foil", Product Bulletin, JW Aluminum Company, Undated.

"Architectural Specifications", Product Bulletin, Vytech Industries, Inc., Undated.

"Standing Seam Metal Roofs", Product Bulletin, American Iron & Steel Institute, Undated.

"Metal Solutions", Product Bulletin, Metal Sales Manufacturing Corporation, Undated.-

METAL SANDWICH PANELS

This application claims benefit to provisional application Ser. No. 60/050,900 filed Jun. 26, 1997.

FIELD OF THE INVENTION

The invention relates to metal sandwich panels for use as building enclosure systems, and more particularly relates, in one embodiment, to metal sandwich panels having an insulative core, an interior facer on one side and a metal sheet on the other side.

BACKGROUND OF THE INVENTION

Conventional metal sandwich panels having metal sheets of equal thickness on both sides are well known in the art, and the market is presently evenly divided between cold storage and industrial/architectural uses. Approximately 36 million square feet of usage is in wall panels, with only an estimated 4 million square feet in roofing. Growth in the roofing segment has been more limited due to concerns surrounding through-fastened assemblies, although standing seam metal roofing is gaining wider acceptance.

From a product performance standpoint, metal sandwich panels offer the highest value in use for cold storage construction. Their insulating efficiency is unmatched. More importantly, metal skins provide an optimum vapor barrier, particularly when combined with closed cell polyurethane or polyisocyanurate foams. Properly assembled, these systems prevent either moisture intrusion or interior condensation. Not surprisingly, metal sandwich panels are preferred in high humidity process environments, such as those in the paper industry.

Despite performance advantages, metal sandwich panels have remained a relatively high cost product with limited use despite tremendous growth for metal buildings in general. With typical metal sandwich panel costs ranging from $2.50 to $5.00 per square foot, these products have remained uncompetitive with conventional fiberglass insulated metal panel systems. A significant improvement in product design and economics is desired to improve demand for metal sandwich panels.

SUMMARY OF THE INVENTION

Accordingly, it is an object of the present invention to provide a metal sandwich panel which is competitive economically.

Another object of the invention is to provide a metal sandwich panel that is aesthetically attractive on both sides.

A further object of the invention is to provide a metal sandwich panel that can employ a standing seam panel profile.

Still another object of the invention is to offer greatly improved structural performance of single skin standing seam products via reduction of crossbow deflection under negative load.

In carrying out these and other objects of the invention, there is provided, in one form, a poured-in-place sandwich panel which has a planar, rigid, cellular polyisocyanurate or polyurethane foam core, where the core contains glass fibers; an interior facer on a first side of said polyisocyanurate foam or polyurethane core; and a metal skin on a second side of said polyisocyanurate or polyurethane foam core.

It will also be appreciated that the proportions of thicknesses of the various layers have been greatly exaggerated for clarity, and can vary without departing from the scope of the present invention.

DETAILED DESCRIPTION OF THE INVENTION

The metal sandwich panel of the invention uses a polyisocyanurate foam core. A preferred embodiment of the metal sandwich panel includes glass fiber reinforcement, interior side vapor barriers, and aesthetically appealing surfaces. Preliminary estimates forecast that the market for the metal sandwich panels of the invention at about 250 million square feet.

From a product economics standpoint, existing, conventional sandwich panel technology is uncompetitive. In the present invention, the interior metal liner is replaced with a durable, flexible facer or a metal facer which is much thinner than currently employed. This makes it desirable to mechanically reinforce the polyisocyanurate foam core. According to a preferred embodiment, this reinforcement is provided by glass fibers in the polyisocyanurate foam core. If there is no structural reinforcement such as that provided by glass fibers, in the event of fire the char will fracture and break loose and propagate the flames. Thus, a method of introducing glass during the lamination process is critical in assuring foam quality and output rates. The glass fibers also provide structural strength, and permit flammability characteristics to be improved without an increase in cross bow as compared with identical panels having no glass fiber reinforcement. Additionally, panels containing glass fibers in the core have been found to permit greater linear movement as compared with panels not having glass fibers.

In addition to flammability performance, the metal sandwich panel of this invention also includes a vapor barrier to prevent interior condensation. The character of the vapor barrier, also known herein as an interior facer (which may be of metal or other non-flammable material), takes into account long-term adhesion, interior aesthetics, and all structural considerations. Additionally, the design of the foam edge detail remains an optional, though important part of the vapor barrier, as well assuring thermal efficiency. The joints between the panels should be thermally tight.

With respect to product design, a unique feature is the ability to employ a standing seam profile. The design constraints for existing, conventional sandwich panel technology limit their ability to make acceptable joint assemblies. Further, the sandwich panels of this invention practically and economically permit a reduction in foam density. It is further anticipated that the metal sandwich panels of this invention can be continuously produced on high-speed foam lamination equipment, to improve processing economics.

Figure 1:
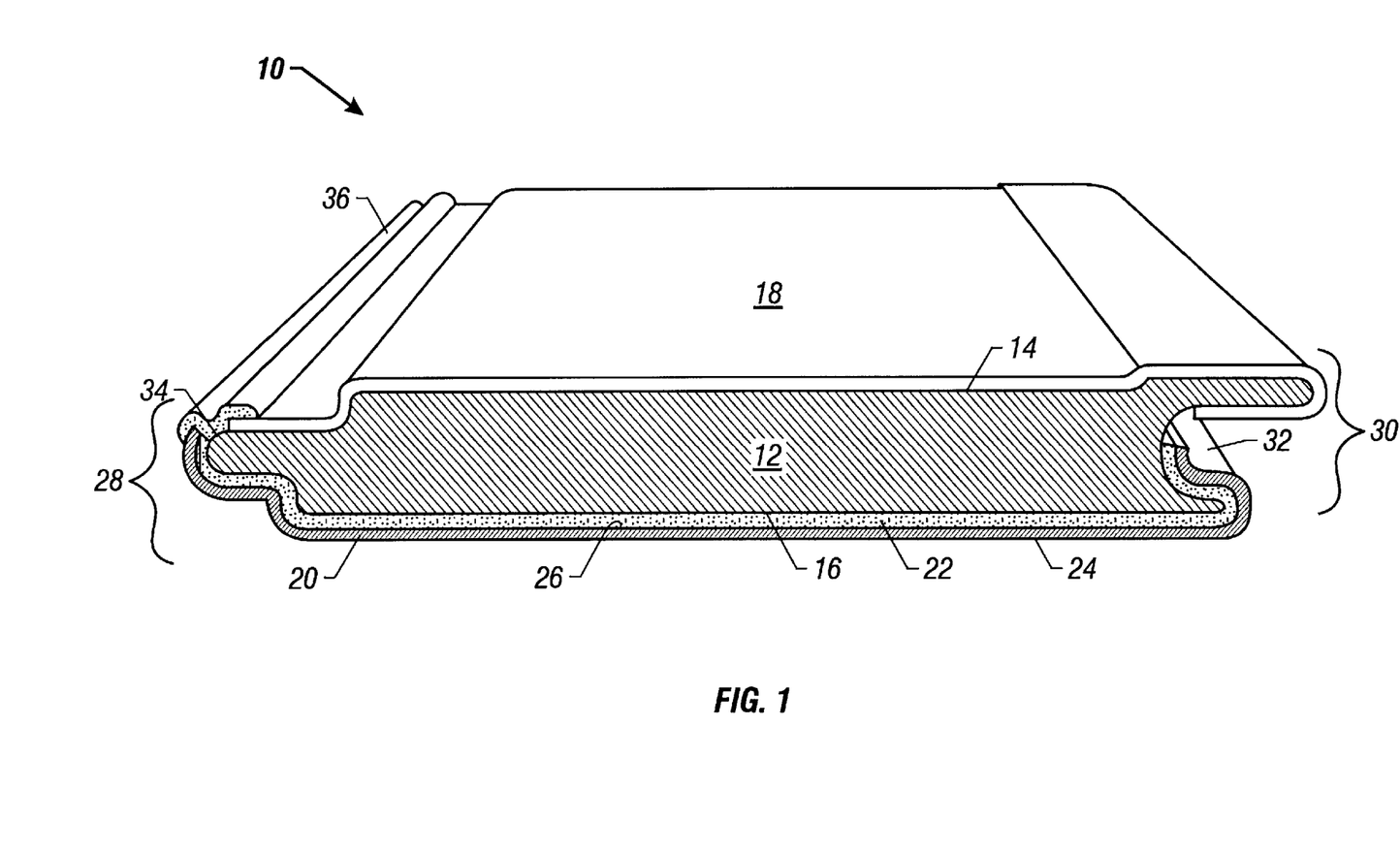
FIG. 1 is a cross-sectional view of a poured-in-place metal sandwich panel of the present invention, such as might be used as wall board, greatly foreshortened.

As seen in FIG. 1, a preferred embodiment of the present invention comprises a poured-in-place sandwich panel 10 having a planar, rigid, cellular polyisocyanurate foam core 12, having a first side 14 and a second side 16. Because the planar, rigid, cellular polyisocyanurate foam core 12 is also planar, second side 16 may be understood as the side opposite first side 14. In other words if first side 14 is the obverse side, second side 16 is the reverse side. The poured-in-place sandwich panel 10 depicted in FIG. 1 is particularly suited as a wall panel. An interior facer 18 is present on the first side 14 of foam core 12. A metal skin 20 is positioned adjacent the second side 16 of the foam core 12 after the application of a primer layer 22 on the inner surface 26 of metal skin 20 to improve adhesion of the metal skin 20 to the foam core 12. In one embodiment of the invention, the interior facer 18 and the metal skin 20 are parallel facing sheets, one on each side (14 and 16, respectively) of said planar, rigid, cellular polyisocyanurate foam core 12.

Figure 2:
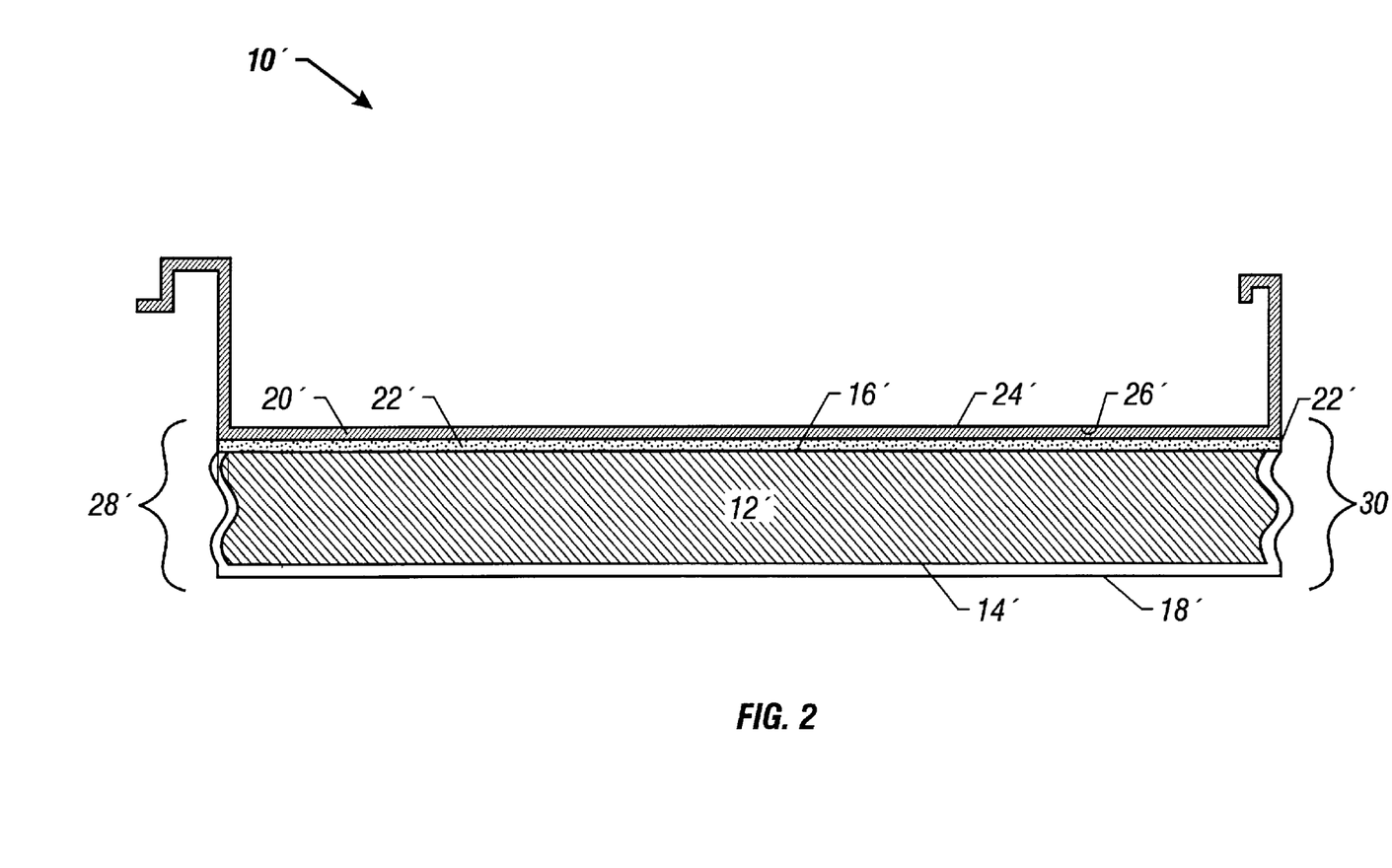
FIG. 2 is a cross-sectional view of a poured-in-place metal sandwich panel of the present invention, such as might be used as in a standing seam roof profile.

The poured-in-place sandwich panel 10' depicted in FIG. 2 is particularly suited for use as a roof panel with a standing seam profile. Corresponding reference numerals will be used for corresponding elements, with the addition of a prime (') mark, for convenience. Poured-in-place sandwich panel 10' has a planar, rigid, cellular polyisocyanurate foam core 12', with a first side 14' and a second side 16'. An interior facer 18' is present on the first side 14' of foam core 12'. A metal skin 20' is positioned adjacent the second side 16' of the foam core 12' after the application of a primer layer 22' on the inner surface 26' of metal skin 20' to improve adhesion of the metal skin 20' to the foam core 12'. Again, in one embodiment of the invention, the interior facer 18' and the metal skin 20' are parallel facing sheets, one on each side (14' and 16', respectively) of said planar, rigid, cellular polyisocyanurate foam core 12'.

As non-limiting examples, the thicknesses of the various layers depicted in FIG. 1 may have the following broad and preferred thicknesses:

TABLE A

Thicknesses of Poured-in-place Sandwich Panel Layers

| Layer | Broad Range | Preferred Range |
|---|---|---|
| planar, rigid, cellular polyiso-cyanurate foam core 12 | 0.5–8 in. | 1–4 in. |
| interior facer 18 | 0.9–18 mils | 3–15 mils |
| metal skin 20 | 20–28 gauge | 24–26 gauge |
| primer layer 22 | 0.02–4 mils | 0.02–1 mil |

Planar, Rigid, Cellular Polyisocyanurate Foam Core

The planar, rigid, cellular polyisocyanurate foam core 12 is made by reacting at least one organic di- or polyisocyanate with one or more polyols and a suitable trimerization catalyst system. Cyclic alkylene carbonates may be used in addition to the polyols. Polyamines are optional additives to the foam system, which may give, in turn, a proportion of polyurea groups. In fact, the methods and structures of this invention may be employed with entirely polyurethane foam cores. The inventive metal sandwich panels herein suitably employ known or conventional polyisocyanurate foams, as well as those yet to be developed. Since a cellular foam is required to provide good thermal insulation, a blowing agent is preferably used to create the insulative, cellular structure.

In one embodiment of the invention, the isocyanate index ranges from about 2 to about 3, preferably from about 2.4 to about 2.7. In another embodiment of the invention, the foam density (without including glass fibers) ranges from about 1.6 to about 2.4 lbs/ft$^3$, preferably from about 1.9 to about 2.1 lbs/ft$^3$.

Further, the planar, rigid, cellular polyisocyanurate foam core 12 preferably, but optionally, contains additives to improve its flame retardant abilities. A preferred additive includes glass fibers (not shown in the Figures) which not only improve the flame retardant abilities of the foam core 12, but also provide mechanical reinforcement. Conventional glass mats placed within the foam core 12 are also acceptable. An acceptable glass mat is UNIFILO® 816 continuous strand mat manufactured by Vetrotex Certain Teed Corporation. For example, the methods described in U.S. Pat. Nos. 4,284,683; 4,346,133; 4,386,983; and Re. 30,984, which are incorporated by reference herein, may be used in the present invention for placing glass mats within the laminates of the sandwich panels 10 and 10'.

Newer technologies, such as injecting longer fibers into the foam-forming mixture may be even more attractive. Such systems have been developed for the automobile industry, but may be advantageously employed herein. The length of the glass fibers may range from ¾" to even 6", and they may be injected into the mix by a roving technique immediately following application of the polyisocyanurate foam-forming mixture. This method of introducing glass fibers into the foam core 12 is expected to be cost effective and process friendly. Injection of fibers into polyurethane has been proven by the LFI-PUR® process and machinery developed by Krauss-Maffei for the automotive industry. The procedure employs a process head using a cutter that cuts fiberglass strands from a roving supply and immediately injects the strands into the polyurethane foam-forming mixture which is injected into conventional S-RIM molds. It will be understood that the foregoing are merely illustrative, and that any known or future technique for incorporating glass fibers may be employed in the present invention.

Similarly, any known flame retardant additive or technique may be used in conjunction with the sandwich panels 10 and 10' of the subject invention, including, but not necessarily limited to, halogens, hydrates or intumescents, including polymeric forms of these materials. A particularly promising form of intumescent flame retardant is expandable graphite flake, such as that sold as GRAFGUARD™, sold by UCAR Carbon Company Inc. Expandable graphite enlarges upon heating to 100 times its size and, upon expansion, forms a barrier to flame spread. Intumescent resins, such as those developed by Georgia-Pacific Resins Inc. (GPRI) are also expected to be effective, as is a recent combination of the GPRI resins and GRAFGUARD expandable graphite flake. Heat-expandable graphite may also be combined with other flame retardant additives, such as oxides and complex oxides of antimony, boron and/or molybdenum, phosphorous compounds and the like. These particulate or powder additives can be blended into either the "A" side or the "B" side of the polyisocyanurate foam-forming mixture. If the graphite is injected with the other foam-forming components, care must be taken to ensure the mixing head is not clogged by the particles. The particulate or powder additives can also be placed or provided by mechanical means, such as applied on top of one of the continuous surfaces (e.g. either the metal skin, the primer layer, or the interior facer) that is to be contacted with the foam core.

When glass fibers are used in the polyisocyanurate foam core 12, the glass loading should range from about 5 to about 25 wt. % based on the total polyisocyanurate foam-forming mixture; preferably, from about 10 to about 15 wt. %. Samples used in the Examples herein generally have about 12 wt. % glass loading.

In more detail, a wide variety of organic isocyanates including alicyclic and aromatic polyisocyanates may be employed in the instant invention, and are characterized by containing two or more isocyanate (NCO) groups per molecule.

Suitable organic di- or polyisocyanates include, but are not limited to, p-phenylene diisocyanate; polymethylene polyphenyl isocyanate; toluene-2,4'- and 2,6-diisocyanate or mixtures thereof; dianisidine diisocyanate; hexamethylene diisocyanate; naphthalene-1,4-diisocyanate; octylene-1,8-diisocyanate; 4,4'-diphenylpropane diisocyanate; 3,3'-dimethyl diphenylmethane-4,4'-diisocyanate; triphenylmethane triisocyanate; 3,3'-ditolylene-4,4'-diisocyanate; 4-chloro-1,3-phenylene diisocyanate; 1,4-, 1,3-, and 1,2-cyclohexylene diisocyanate; and the like, including those of U.S. Pat. No. 3,577,358, incorporated by reference herein. Mixtures of polyisocyanates may be used, which for example, are the crude mixtures of di- and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, incorporated by reference herein, both known as crude MDI or PMDI. The organic polyisocyanates may be isocyanate-terminated prepolymers made by reacting under standard known conditions, an excess of a polyisocyanate with a polyol which on a polyisocyanate to polyol basis may range from about 20:1 to 2:1 and include, for example, polyethylene glycol, polypropylene glycol, diethylene glycol monobutyl ether, ethylene glycol, monoethyl ether, triethylene glycol, etc. and the like, as well as glycols or polyglycols partially esterified with carboxylic acids including polyester polyols and polyether polyols. Known processes for the preparation of polyamines and corresponding methylene bridged polyphenyl polyisocyanates therefrom are disclosed in the literature and in many patents; for example, U.S. Pat. Nos. 2,683,730; 2,950,263; 3,012,008; 3,334,162; and 3,362,979, incorporated by reference herein. The isocyanates may contain impurities or additives such as the carbodiimides or uretonimine modified MDI products. The preferred polyisocyanates are diphenylmethane 2,4'-isomers which may include the 2,2'-isomer and the higher functional polyisocyanate polymethylene polyphenyl isocyanate mixtures, which may contain from about 20 to about 85 weight percent of the diphenylmethane diisocyanate isomers. In general, the organic isocyanates will have a molecular weight in the range of between about 100 and about 10,000. Typical of the preferred polyisocyanates are those sold commercially as PAPI® 580 and PAPI 27 sold by Dow Chemical Company. The amount of isocyanate employed to prepare the rigid, cellular polyisocyanurate foam core will be from about 95/5 to about 50/50 isocyanate/carbonate, and preferably from about 80/20 to about 65/35 parts by weight based on the isocyanate-carbonate ingredients in the reaction mixture, in cases where cyclic alkylene carbonates are optionally used.

The polyether polyols or mixtures thereof may be employed in the present invention in amounts of from about 2 to about 50, preferably from about 10 to about 25 parts by weight based on the total weight of the polyisocyanurate components. They may be polyoxyalkylene polyether polyol, and include those having 2 to about 10 hydroxyl groups, preferably 2 to 8. Polyols suitable for reaction with di- and polyisocyanates include, but are not limited to polyether polyols made by the reaction of diols or triols with 1,2-alkylene oxides. For example, alkylene oxides may be added to polyhydric initiators, including but not necessarily limited to ethylene glycol; diethylene glycol; water; propylene glycol; dipropylene glycol; glycerine (glycerol); trimethylene glycol; 1,2-, 1,3-, and 1,4-butanediol; 1,2,6-hexanetriol; trimethylolethane; trimethylolpropane; pentaerythritol; sorbitol; sucrose; and the like to prepare products in the 125–1000 hydroxyl number range, preferably 200 to 800. The alkylene oxides suitable for use include, but are not necessarily limited to, ethylene oxide; propylene oxide; 1,2-, and 2,3-butylene oxide; styrene oxide; epichlorohydrin; epibromohydrin; mixtures thereof and the like. The polyether polyols may be diols or triols or mixtures thereof. Further information about suitable polyether polyols and methods for their preparation may be found in Saunders and Frisch, *Polyurethanes: Chemistry and Technology,* Interscience Publishers, 1964. Suitable polyether polyols also include those that are modified in some way, for example, by reaction or addition with other compounds.

Typical of the preferred polyether polyols is VORANOL® 520 and VORANOL 360, polyether polyols sold by Dow Chemical Company. Amine- or hydroxyl-terminated polybutadiene may also be employed. Chain extenders or mixtures thereof may also be used along with the polyether polyols in the total formulation. Such chain extenders may include, but are not necessarily limited to, mixtures of difunctional and trifunctional chain extenders. Typical, known chain extenders which may be used include diols, amino alcohols and diamines or mixtures thereof.

Aromatic polyester polyols may also be employed, and may comprise up to 75 wt. % of the polyol blend. Aromatic polyester polyols may have a functionality ranging from about 1.9 to about 2.4, and a hydroxyl number ranging from about 200 to 400, preferably from about 235 to 320. Suitable aromatic polyester polyols include, but are not limited to TERATE® 203 and TERATE 2541 produced by Hoechst Celanese from DMT residues; polyester polyols made from phthalic anhydride residues sold by Stepan Chemical Co., and polyester polyols made from recycled PET residues sold by Oxid.

The cyclic alkylene carbonates which may be employed in the present invention in amounts of from about 2 to about 50 preferably from about 10 to about 25 parts by weight based on the total isocyanate and carbonate composition have the general formula:

wherein R is hydrogen, $CH_3$, $C_2H_5$ or $C_{3 \text{ to } C10}$ hydrocarbons. Typical alkylene carbonates include, but are not limited to, ethylene carbonate, propylene carbonate, butylene carbonate, mixtures thereof and the like. Liquid alkylene carbonates are preferred, however solid or semi-solid carbonates may be used if liquified with other liquid alkylene carbonates or by the reaction temperature at which they are employed. Propylene carbonate is a preferred cyclic alkylene carbonate, and it improves adhesion and lamination of the foam.

A preferred isocyanate trimerization catalyst system which can be used to make the polyisocyanurate foams of this invention is a unique blend of (1) a salt of an organic acid; (2) a salt of an amino add; and. (3) an organic salt of tertiary amine solubilized in a fatty acid ethoxylate. In one non-limiting embodiment of the invention, the trimerization catalyst system gives a delayed gel time of from about 20 to about 60 seconds. Conventional isocyanate trimerization catalyst systems may also be used.

As noted, there are a number of other additives and ingredients suitable for incorporating into the polyisocyanurate foam core 12 of this invention, including but not necessarily limited to, fire retardants, blowing agents, surfactants or surface-active agents, reinforcing materials, and the like. For example, as noted above, glass fibers are a preferred fire-retardancy and reinforcing additive, as is known in the art. In an additional non-limiting example, surfactants such as DABCO® DC-93 and XF-H25-73 available from Air Products might be used with the non-CFC blowing agents that could be employed in the polyisocyanurate foams of this invention. In any event, the surfactant needs to be optimized for the blowing agent, for instance, mixed blends of pentanes and HFCs.

Preferred blowing agents may include, but are not necessarily limited to, hydrofluorocarbons (HFCs) such as HPC-152a, HFC-134a, HFC-134, HFC-143 and blends thereof. Hydrochlorofluorocarbons (HCFCs) may also be used. Hydrocarbons, such as cyclopentane, isopentane and n-pentane, have also found utility as blowing agents, both alone and together with HFCs and HCFCs. A preferred type of cyclopentane is "synthetic" cyclopentane formed by depolymerizing dicyclopentane. In one non-limiting embodiment of the invention, the ratio of hydrocarbon blowing agent to HFC may range from 5–95%, preferably 20–40%. One preferred blowing agent is a blend of HFC-152a and cyclopentane. Other combinations includes blends of HFC-134 and cyclopentane.

The proportions and reaction temperatures for forming the planar, rigid, cellular polyisocyanurate foam core are well known in the art. In a preferred embodiment, the various components to make the foam are mixed through a multiple-head mixing nozzle at relative high speed in between the interior facer 18 and the metal skin 20.

One embodiment of the invention would employ 75% polyester polyol, 10% polyether polyol initiated with sucrose and 15% trichloropropylphosphate as the polyol blend in the B side. An isocyanate index would be 2.5, and the catalyst system would be a blend of potassium octoate, potassium acetate and pentamethyldiethylenetriamine (PMDETA) in a ratio of 2:0.5:0.5. The foam density would be expected to be about 2 lbs/ft$^3$. The blowing agents would be the preferred HFCs mentioned above, alone or in combination with a pentane compound, e.g. cyclopentane, isopentane, and n-pentane; from various sources, alone or in combination. A conventional surfactant could also be used.

Metal Skin

The metal skin 20 of the poured-in-place sandwich panel 10 of the invention may be electrically conductive or electrically insulative, and may include, but is not limited to, copper, brass, iron, zinc, nickel, aluminum, steel, stainless steel or other alloys. In one non-limiting embodiment of the invention, steel alloys are the preferred metal. In another non-limiting embodiment, aluminum is a preferred metal because of its ductility and ease with which it may be manufactured into a material of suitable thickness. The metal skin 20 may be galvanized on the side that is intended for the outer surface, for example, outer surface 24, or on both the outer surface 24 and inner surface 26 of metal skin 20.

Presently, the two most preferred metal skins are galvanized steel and GALVALUME®. GALVALUME is about 45% zinc and 55% aluminum. Galvanized steel typically has, in one non-limiting embodiment, 0.90 oz. zinc/ft$^2$ (total for both sides), and is typically prepainted (preprimed). GALVALUME is not typically prepainted, but may be.

Primer Layer

The primer layer applied to the inner surface 26' prior to the application of the foam-forming mixture, to increase adhesion between the resulting foam core 12' and the metal skin 20 may be selected from a wide variety of choices including, but not limited to polyepoxide systems, polyurethane systems, polyacrylic systems, and polyurea systems. One readily available primer layer is epoxy, which may be provided in layers about 0.02 mil thick, in one non-limiting embodiment. Polyurethane metal primers are also known, and acrylic primers are viable with the new HFC blowing agents described above. In one non-limiting theory, the primer layer penetrates the foam core 12' physically and chemically to form a tight bond.

A preferred primer layer 22 is polyurea generally formed by the reaction of an organic di- or a polyisocyanate and amine-terminated compounds. As noted, its purpose is to improve adhesion between the metal skin 20 and the planar, rigid, cellular polyisocyanurate foam core 12. In general, the suitable polyisocyanates for the polyurea layer are those described above as suitable for making the polyisocyanurate foam core 12. Without being limited to a particular explanation, it is believed that terminal hydrogens in the polyurea layer permit chemical reaction with the reactive groups of the polyisocyanurate foam-forming mixture components.

Suitable amine-terminated polyether polyols are made by aminating polyether polyols such as those described above for the polyisocyanurate foam core 12 by known methods. Particularly preferred amine-terminated polyether polyols include, but are not necessarily limited to, JEFFAMINE® D-2000, JEFFAMINE T-5000, and other di- and tri-functional polyether polyamines, etc. available from Huntsman Petrochemical Corporation, and the like. Preferably, the aminated polyols are terminated with primary amine groups.

In one embodiment of the invention, the primer layer 22 is applied to the metal skin 20 on the inner surface 26 thereof shortly after metal skin 20 is uncoiled from its roll and flattened and profiled, just before the metal skin 20 is brought into close proximity of the interior facer 18 and the polyisocyanurate foam mixture is applied therebetween. If necessary, the continuous production line may be designed or adjusted to permit the polyurea primer layer 22 on the surface of metal skin 20 to cure slightly before application of the polyisocyanurate foam mixture.

The primer layer 22 may be applied by any known technique to inner surface 26, including, but not necessarily limited to, nip roll coating, dip coating, and electrodeposition.

Metal skin 20 will typically come with a primer layer of some sort already present. If metal is used as interior facer 18, then it will also already be provided by the manufacturer with a primer layer. Some kind of primer layer is necessary for the polyisocyanurate foam to adhere to a metal surface.

Interior Facer

The interior facer 18 of the poured-in-place sandwich panel 10 of this invention may be selected from a wide variety of materials including any suitable single or multi-layer material. Interior facer 18 is not only thinner than metal skin 20, but more flexible than metal skin 20 as well. Interior facer 18 is preferably non-flammable, and preferably, but not necessarily limited to asbestos; glass fibers; polyester; vinyl; polypropylene; other polymeric materials in sheet form, such as elastomers; metals; metallized polymer sheets, such as metallized polypropylene and metallized polyester; fire retardant papers, e.g. bitumen paper; sodium kraft paper; aluminum or other metal foil; and cellulosic lamina, which may include wood, particle board, fibers, particles and the like (e.g. straw, nut shells, rice and oat hulls, etc.) which are cellulosic and formed into sheets and layers and which may be treated to be flame retardant, and composites thereof. For example, composites of fiberglass and polyester yarns are known. In a preferred embodiment of the invention, the interior facer 18 comprises a blend of fiberglass and polyester, with an optional, additional aluminum foil thermal barrier. When an aluminum or other metal foil is used, an elastomeric adhesive, in a non-limiting example, the polyurea materials discussed above, may be used to bind the foil to another layer, such as a fiberglass/polyester blend. Indeed, polyurea or other suitable elastomeric adhesive may be used to bind any of the above layers together to form a suitable interior facer 18.

Interior facer 18 may also be metal. Any of the metals listed above with respect to metal skin 20 would be suitable for the interior facer 18. It is anticipated that interior facer 18, if metal, would be thinner than metal skin 20, although this is not necessarily the case.

Interior facer 18 should be relatively thin and inexpensive. For example, if the interior facer 18 is not metal, the total thickness of the interior facer 18 may range from about 0.9 mils to about 15 mils, and preferably from about 3 mils to about 10 mils, although if the facer 18 is multi-layered, each sublayer may be thinner than these ranges. If the interior facer 18 is metal, the total thickness thereof may range from about 18 mils to about 15 mils, and preferably from about 18 mils to about 17 mils, in one non-limiting embodiment. In another non-limiting embodiment, the interior facer 18 is 28 gauge metal and the metal skin 20 is 26 gauge.

Suitable interior facers 18 include, but are not limited to the following available from LAMTEC® Corporation: LAMTEC WMP®-VR composed of 0.0015" white polypropylene film, a reinforcing layer of 4×4 scrim having a blend of fiberglass and polyester yarns, and a 11# kraft paper; LAMTEC WMP-30 composed of a 0.0015" white metallized polypropylene film, a reinforcing layer of 5×5 scrim of a blend of fiberglass and polyester yarns, and a 30# kraft paper, LAMTEC R-3035 HD composed of 0.0003" aluminum foil with an elastomeric vapor barrier coating, a reinforcing layer of 5×5 scrim of a blend of fiberglass and polyester yarns, and a 30# kraft paper, and the like.

Suitable interior facers may also include the following available from VyTech Industries, Inc.: VyTech Atlas 96® composed of 0.0032" white polyvinylchloride (PVC) film with Taffeta embossing; VyTech Atlas VRV™ composed of two 0.00155" white PVC vinyls reinforced with a tridirectional 3¼"×1¼" fiberglass scrim; VyTech Atlas VRP™ composed of a 0.00225" white PVC vinyl and a 0.0005" metallized polyester reinforced with a tridirectional 3¼"× 1¼" fiberglass scrim, and the like. Aluminum foils suitable for use in interior facers in thicknesses as light as 0.00065" are available from JW Aluminum Company.

In another non-limiting embodiment of the invention, the interior facer 18 and the metal skin 20 are properly thought of as parallel facing sheets, one on each side of the planar, rigid, cellular polyisocyanurate foam core 12. In the particular embodiment shown in FIG. 1, interior facer 18 is on first side 14 and metal skin 20 is on second side 16 of foam core 12.

In yet another non-limiting embodiment of the invention, the primer layer 22 and metal skin 20 may extend around at least one edge of the rigid, cellular polyisocyanurate foam core to be in close proximity with the interior facer 18. Gaps 32 and 34 may be seen in FIG. 1 between the primer layer 22 and the metal skin 20 on the right and left sides of the panel 10 depicted, respectively. In one embodiment, it is preferred to keep this gap to no more than ¼". It may be necessary or desirable to apply a separate bridging strip 36 over this gap, such as over gap 34 to help ensure a thermal seal between panels 10. Bridging strip 36 may be any of the materials described above as suitable for primer layer 22, and indeed, if bridging strip 36 is the same material as primer layer 22, thermal compatibility and sealing will be assured. Bridging strip may be provided by any conventional, known technique including, but not limited to, spraying, rolling, dipping, and the like.

Production Process

The production process for the metal sandwich panels of this invention will be continuous, and will use a continuous, fixed conveyor. Such systems are called "pressure conveyors" or "fixed gap" systems.

Briefly stated, the process for producing a poured-in-place sandwich panel according to the present invention involves applying the primer layer 22 to a metal skin 20 (if one is not already present), for instance on the inner surface 26 thereof, where the metal primer 22 improves adhesion between the metal skin 20 and a rigid, cellular polyisocyanurate foam 12. The interior facer 18 is brought within close proximity of the metal skin 20. In one embodiment of the invention, both the primer layer 22 on the metal skin 20 and the interior facer 18 are contacted essentially simultaneously with a rigid, cellular polyisocyanurate foam-forming mixture, which quickly becomes the planar, rigid, cellular polyisocyanurate foam core 12, thereby forming the finished poured-in-place sandwich panel 10. In another embodiment of the invention, the polyisocyanurate foam-forming mixture is provided on either the primer layer 22 on the metal skin 20 or the interior facer 18 before the opposing interior facer 18 or metal skin 20, respectively, are brought into close contact with the polyisocyanurate foam-forming mixture.

In somewhat more detail, the metal skin 20 and interior facer 18 are provided in coils on a continuous production line, and the metal skin 20 first must be uncoiled, leveled and flattened. The interior facer 18 need only be unrolled, unless it is metal, in which case it win need to be uncoiled, leveled and flattened as well. At this stage, both the metal skin 20 and the interior facer 18 may be preheated. If necessary or desired, the metal skin 20 is profiled, and a flat, striated, or other surface form or embossing is imparted to it. If the interior facer 18 is metal, it may also be profiled, and a given a surface pattern or texture. In one embodiment of this invention, the edges of the continuous metal skin 20 are contoured and detailed prior to application of the primer layer 22. The primer layer 22 is then provided to the inner surface 26 of the metal skin 20 in a continuous fashion. Depending on the cure rate of the polymer used in primer layer 22, a delay may be necessary in the continuous production line before the next step. Additionally, partial or complete curing of the primer layer 22 may be accomplished in an oven or heating chamber.

In one alternate embodiment of the invention, the planar, rigid, cellular polyisocyanurate foam core 12 may be formed first, the primer layer 22 may be applied to one side of the core 12 before metal skin 20 is applied thereto. It is not expected that this alternative would permit volume production of panels nor facilitate edge detailing.

At some point in the continuous process, the formed and/or primed sheets, the metal skin 20 and interior facer 18 are then brought together and the mixture of reactants used to make the planar, rigid, cellular polyisocyanurate foam core 12 are injected between skin 20 and facer 18, preferably through an oscillating mixing nozzle from multiple lines. As the polyisocyanurate foam core 12 expands, it fills the panel cavity. The poured-in-place sandwich panel 10 then enters a moving compression/heat chamber where expansion, reaction rate, thickness and sheet adhesion are further precisely controlled. The still-continuous panel next enters a flying saw area where the panels are cut to the prescribed length and then moved by conveyor and transfer and run-out tables to a packaging and shipping area.

In one optional embodiment of the invention, at least one edge of said rigid, cellular polyisocyanurate foam core 12 is compressed into a cross-sectional contour to mate with a cross-sectional contour of an adjacent panel. This edge design is what has been referred to as foam edge detail. Foam edge detail is exemplified, but not limited to, the generally convex panel contour 28' and the generally concave panel contour 30' shown in FIG. 2. Note that contour 28' mates with contour 30'. An exemplary, non-limiting generally convex panel edge contour 28 is shown on the left side of the panel 10 shown in FIG. 1, whereas a mating, generally concave panel edge contour 30 is shown on the right side of the panel 10 in FIG. 1. These edges, e.g. 28 and 30, are continuously formed in the continuous production line after formation of the rigid, cellular polyisocyanurate foam core 12, but before the individual panels 10 are sawed apart.

The invention will be further illustrated with reference to the following non-limiting Example, which will provide more detail about an anticipated implementation.

EXAMPLE 1

Prepainted galvanized steel, 26 gauge, would be continuously unrolled and flattened through a conventional series of rollers. A polyurea primer layer (equivalent parts MDI and JEFFAMINE T-3000 amine) would be continuously sprayed on the inner (non-painted) surface of the steel and permitted to cure 10 seconds before the steel is passed under a continuously spraying polyisocyanurate mixing head (described below). Alternatively, the primer layer would be already applied to the steel.

The polyisocyanurate foam-forming mixture would be applied in two streams, the B stream of which would be 75% TERATE 203, 10% VORANOL 520 (sucrose) and 15% FYROL® PCF (from Akzo Nobel), and the A stream of which would be MDI. The isocyanate index would be 2.5, and the catalyst would be a blend of potassium octoate, potassium acetate and PMDETA in a ratio of 2:0.5:0.5. The blowing agent would be a blend of HFC-152a and "synthetic" cyclopentane, and a surfactant compatible with this blowing agent would be employed. The foam density would be 2 lbs/ft$^3$. The polyisocyanurate foam-forming mixture, including the blowing agent, would be applied through a Krauss-Maffei LFI-PUR-type injection head which would also inject 5"-long glass fibers into the mixture. Immediately, a conventional series of rollers would continuously bring a sheet of VyTech Atlas VRP facer paper to within one inch of the inner surface of the steel skin. The polyisocyanurate foam core would be allowed to expand and cure within the limits of the interior facer and the metal skin 40 seconds. After the polyisocyanurate form core was effectively cured, the sheets would be sliced apart using conventional cutting equipment to the desired length.

Foam Formulation for Examples 2 through 11

The following proprietary formulation was used for these Examples:

| A-Side: | Polyisocyanate PAPI ® 580 | |
|---|---|---|
| B-Side: | Polyester polyol | 64% |
| | Sucrose polyol | 4% |
| | PCF flame retardant | 3% |
| | HCFC 141B Blowing agent | 26% |
| | Surfactant & Catalyst | 3% |
| | | 100% |

Isocyanate index: 2.40

The PCF flame retardant was a tris-β-chloroisopropanol phosphate available from Akzo. The catalyst was a proprietary trimerization catalyst blend.

The catalyst amount and the isocyanate index were reduced from what is expected to be an optimum formulation, to slow the reaction profile sufficiently to permit the glass fibers and glass mats to be placed on the continuous line. The lower catalyst amounts and reduced index would be expected to affect the end results somewhat. The glass mat used was UNIFILO® 816 continuous strand mat manufactured by Vetrotex Certain Teed Corporation. The mat is applied using a roving high performance gun that chops or sizes the fibers into lengths ranging from about 3 to 4 inches in length. In this way the fibers may be dispersed uniformly with essentially no clumping in the spray pattern. This method also provides for flat lay-down of the fibers. The panels were made on a commercial Hennecke high pressure equipment line using a traverse head.

TABLE I

ASTM 1592 Uniform Load Test

| Ex. | Panel Type | Panel Width (in.) | Cross Bow* (in.) |
|---|---|---|---|
| 2 | Single skin, 24 gauge steel, no foam | 18 | 3¼ |
| 3 | Outer skin: 26 gauge steel<br>Core: 2" polyisocyanurate foam<br>Interior facer: kraft/scrim | 24 | 1 |
| 4 | Outer skin: 26 gauge steel<br>Core: 2" polyisocyanurate foam with glass mat in core<br>Interior facer: none, bare foam | 24 | ⅜ |

*mid span, mid width at 50 psf uplift as per ASTM 1592

Table I shows that inventive Examples 3 and 4 employing polyisocyanurate foam give panels with considerably reduced crossbow, according to this test, as compared with 24 gauge steel alone. Further, comparing Examples 4 and 3, the incorporation of a glass mat in the core polyisocyanurate additionally reduces crossbow.

TABLE II

Thermal Load Test

| Ex. | Panel Type | Temp., ° F. Outer skin | Temp., ° F. Interior facer | Temp. Diff., ° F. | Mid width, mid span bow (in.) | Thermal Elongation, in. |
|---|---|---|---|---|---|---|
| 5 | Outer skin: 26 gauge steel | 222 | 104 | 118 | 0.20 | 0.06 |

TABLE II-continued

Thermal Load Test

| Ex. | Panel Type | Temp., °F. Outer skin | Temp., °F. Interior facer | Temp. Diff., °F. | Mid width, mid span bow (in.) | Thermal Elongation, in. |
|---|---|---|---|---|---|---|
|  | Core: 2" polyisocyanurate foam with long fiberglass fibers in core Interior facer: 26 gauge steel |  |  |  |  |  |
| 6 | Outer skin: 26 gauge steel Core: 2" polyisocyanurate foam Interior facer: Woven fabric | 230 | 116 | 114 | 0.03 | 0.11 |
| 4 | Outer skin: 26 gauge steel Core: 2" polyisocyanurate foam with glass mat in core Interior facer: none | 219 | 104 | 115 | 0.03 | 0.07 |

Table II demonstrates that panels with fabric facer or no fabric facer react differently to thermal load as compared to a panel with a metal liner. This is evident in the significantly reduced mid span thermal bow for Examples 6 and 4 as compared with Example 5.

Figure 3:
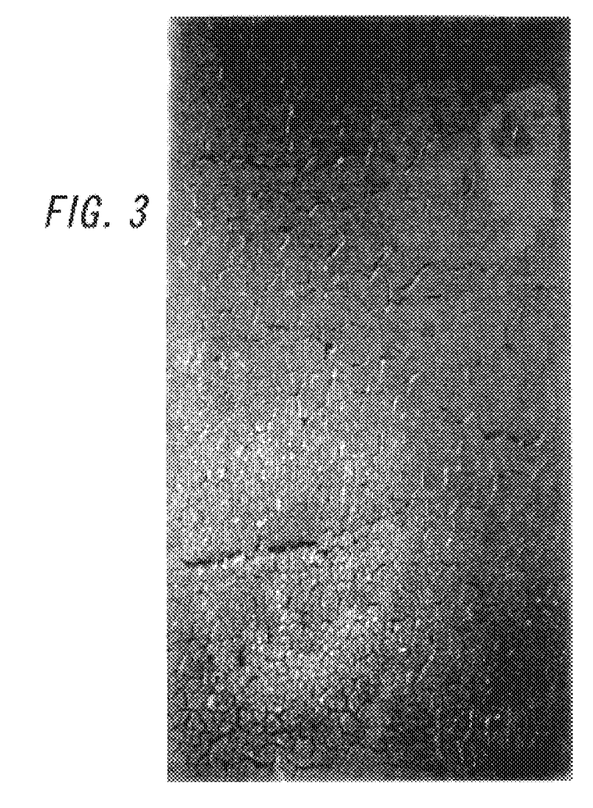
FIGS. 3 and 4 are photographs of the foam of a taken apart poured-in-place metal sandwich panel of Example 4 having a glass mat in the polyisocyanurate core taken from a distance of about 2–3 feet.
Figure 4:
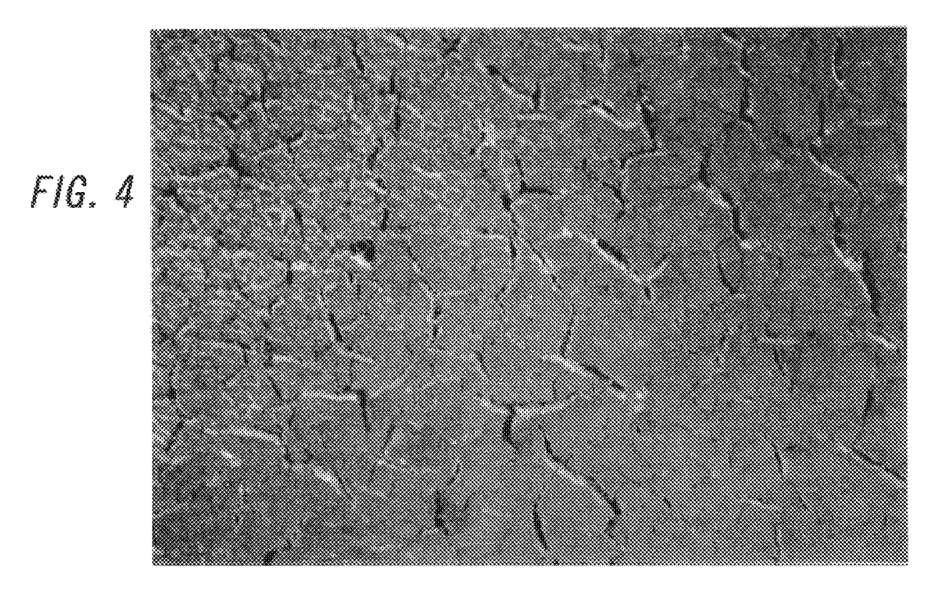
Figure 5:
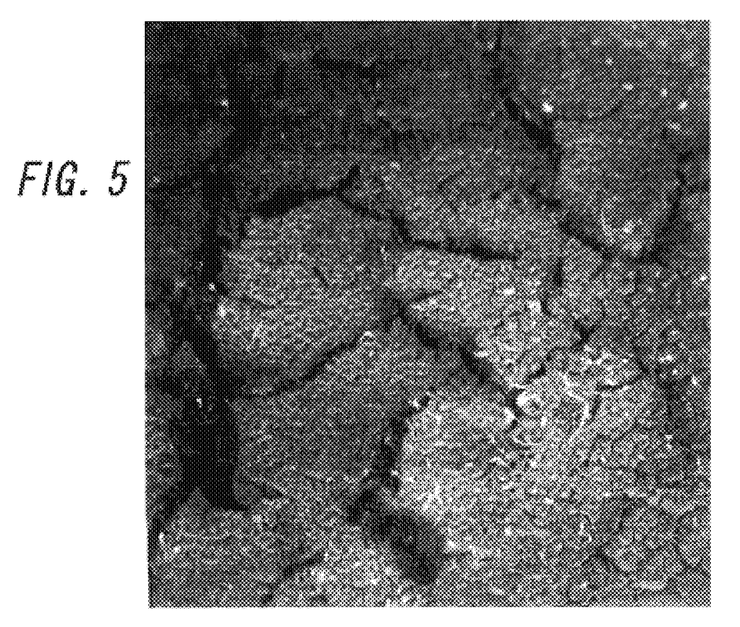
FIGS. 5 and 6 are photographs of the foam of a taken apart poured-in-place metal sandwich panel of Example 5 having long glass fibers in the polyisocyanurate core taken from a distance of about 2–3 feet.
Figure 6:
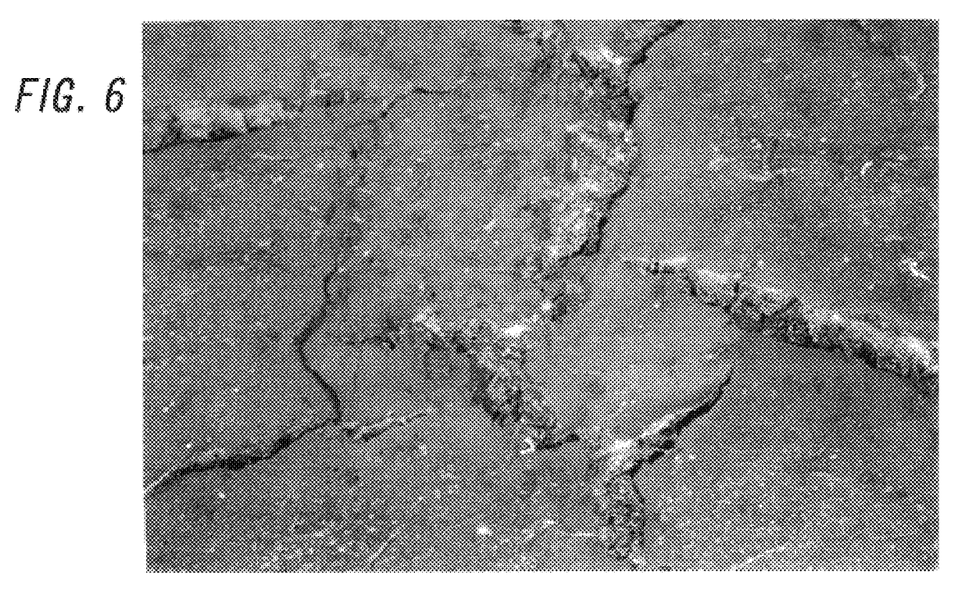
Figure 7:
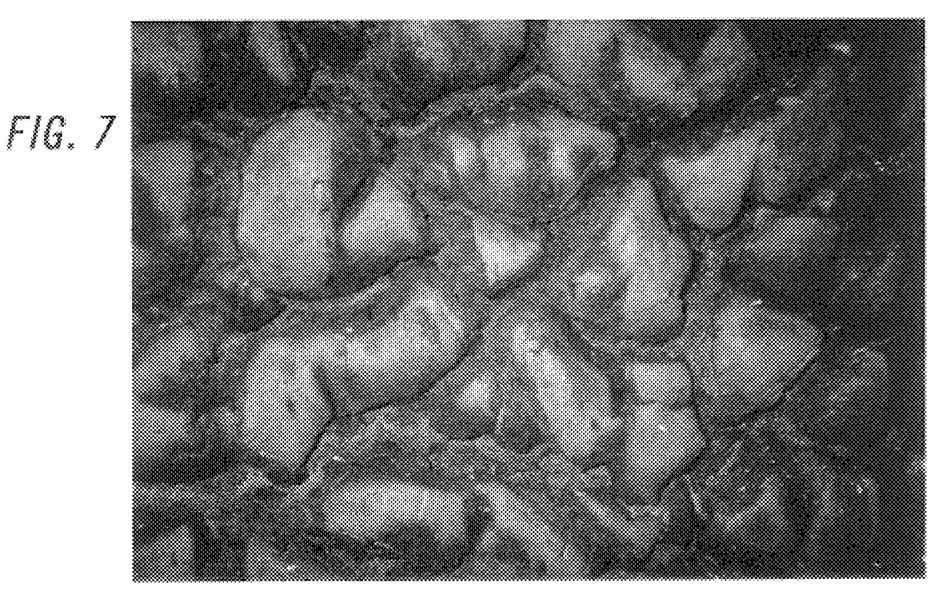
FIGS. 7 and 8 are photographs the foam of of a poured-in-place metal sandwich panel of Example 6 without any glass fibers in the polyisocyanurate core taken from a distance of about 2–3 feet within the box because the panel was disintegrating and could not be taken apart.
Figure 8:
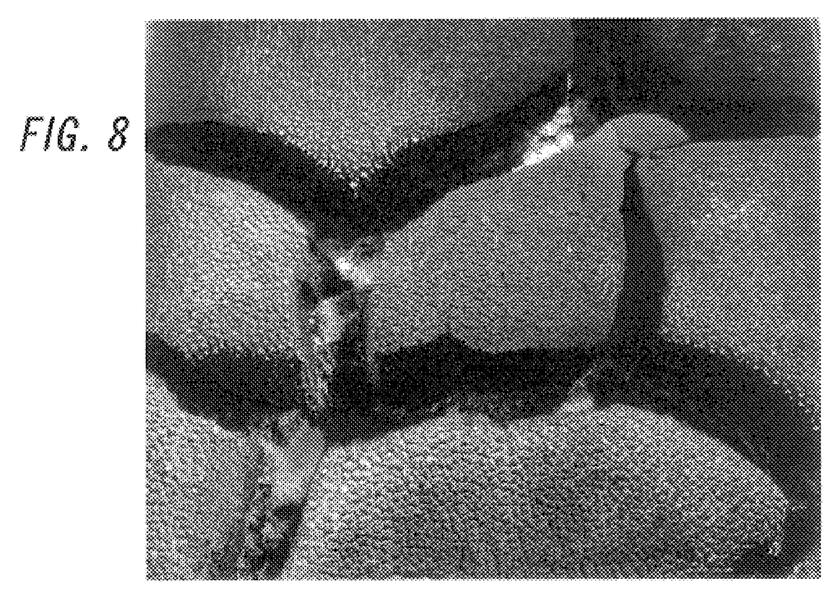

The panels of Example 4 (glass mat in the polyisocyanurate foam core) and Example 5 (long glass fibers in the polyisocyanurate foam core) were put through flammability testing. The panels were disassembled and photographs taken from a distance of about 2 to 3 feet, and are shown in FIGS. 3 and 4 (Example 4), and FIGS. 5 and 6 (Example 5). It may be readily seen that the charred foam is generally intact, where the cracks are relatively small. This is contrasted with the panel of Example 6 which had no glass in the polyisocyanurate foam. This panel could not be taken apart because the foam was crumbling. Thus, the photographs of this panel, in FIGS. 7 and 8 were taken with the foam still in the box. It is evident that the cracks are much larger and wider. It may thus be concluded that the presence of glass within the foam helps keep the foam intact during a fire.

TABLE III

ASTM E84-97a -Standard Test Method for Surface Burning Characteristics of Building Materials

| Ex. | Fire side (interior surface) | Flame spread | Smoke |
|---|---|---|---|
| 7 | Natural foam surface | 25 | 200 |
| 8 | Scrim faced facer | 40 | 400 |
| 9 | Woven fabric facer | 35 | 400 |
| 10 | Natural foam surface with long glass fiber reinforced core | 20 | 175 |
| 11 | Natural foam surface with fiberglass mat reinforced core | 20 | 150 |

In the ASTM E84-97a test, where the results are shown in Table III, the single white steel skin on the first side of the polyisocyanurate foam insulated panels faced the top of the chamber away from the fire source, where the interior surface, with facer, if present, faced the fire source. The interior surface was as indicated in the second column. Each white steel skin was 0.025 in. thick. The polyisocyanurate foam core was 2 inches thick.

Lower test values are better. For Class 1 rated materials, the flame spread must be 25 or less. It is noted that the values for panels of inventive Examples 10 and 11 containing fiberglass in one form or another give the best flame spread and smoke values. The poor results for Examples 8 and 9 may have to do with a surface phenomenon of the facer on the foam.

TABLES IV–VI: UBC 26-3 (1994)

Room Fire Test Standard for Interior of Foam Plastic Systems

In this test, the single white steel skin of the polyisocyanurate foam insulated panels was positioned away from the fire source. Each white steel skin was 0.025 inches thick. The foam was 2 inches thick. The foam surface facing the fire is as indicated in the second column.

TABLE IV

| Ex. | Fire side | Time to ignition, sec. | Time for flame to reach top center corner, sec. | Time for flame out doorway, min:sec | Maximum temp., °F. & time, min:sec | Peak heat flux, btu/ft$^2$-sec | Duration of test, min:sec |
|---|---|---|---|---|---|---|---|
| 7 | Natural foam surface | 42 | 44 | 1:30 | 1680 1:55 | 1.29 | 15:00 |
| 9 | Woven fabric facer | 35 | 41 | 2:00 | 2020 2:30 | >2.0 | 7:30 |
| 10 | Natural foam surface with long glass fiber reinforced core | 23 | 27 | 1:00 | 1720 1:25 | 1.35 | 15:00 |
| 11 | Natural foam surface with fiberglass mat reinforced core | 18 | 20 | 1:53 | 1620 1:53 | 1.14 | 15:00 |

It should be noted from Table IV that in Example 9, the test was halted halfway through due to the foam falling off in chunks. This demonstrates the importance of including glass fibers in the foam core 12 to keep the core together instead of falling apart and propagating the flames.

TABLE V

| Ex. | Fire side | Smoke depth (from ceiling), ft. | Smoke opacity | Extent of charring (total surface area = 192 ft$^2$) | Area not charred, ft$^2$ | Char thickness at 8 ft wall extremity |
|---|---|---|---|---|---|---|
| 7 | Natural foam surface | 4 | dark color heavy density | 192 | 0 | ¾ in. |
| 9 | Woven fabric facer | 5 | dark color heavy density | 192 | 0 | 2 in. |
| 10 | Natural foam surface with long glass fiber reinforced core | 4 | dark color heavy density | 192 | 0 | ⅝ in. |
| 11 | Natural foam surface with fiber-glass mat reinforced core | 3.5 | dark color heavy density | 190 | 2 | ½ in. |

Of the results set out in both Tables V and VI, it will be appreciated that inventive Example 11 gave the best values. Example 10 showed improvements in reduced char thickness (Table V) and cracking which did not extend to the metal facer (Table VI)

TABLE VI

| Ex. | Fire side | Panel appearance after the fire test | Gaps between the metal panels |
|---|---|---|---|
| 7 | Natural foam surface | deep & wide cracks extending inward to metal facer; considerable foam char fallout | ½ in., edges warped, shrank |
| 9 | Woven fabric facer | 1 in. wide cracks, cracks extend to metal facer | ½ in., edges warped, shrank |
| 10 | Natural foam surface with long glass fiber reinforced core | ½ in. cracks, ½ in. deep, cracks did not extend to metal facer | ½ in., edges shrank |
| 11 | Natural foam surface with fiber-glass mat reinforced core | ¼ in. cracks, ¼ in. deep, cracks did not extend to metal facer | ½ in., edges shrank |

EXAMPLES 12–20

Examples 12–20 of Tables VII, VIII, and IX demonstrate the use of alternative hydrocarbon blowing agents. Only Example 19 produced a Class 1 foam. It is expected that these formulations could be optimized with changes in the polyol, index and additional flame retardant to produce foams which could proceed with further testing and refinements after the flame spread values are reduced. No glass fibers were used, which, as demonstrated, would be expected to improve the flammability data.

The following formulations were used in Examples 16–24:

| A side: Polyisocyanate PAPI 580 (Dow Chemical) B side: Formulation + Blowing agent | |
|---|---|
| Formulation | pbw |
| Polyester polyol: Terate-203 (Cape Inc.) | 71.6 |
| Sucrose polyol: Voranol V-520 (Dow Chemical) | 9.5 |
| PCF flame retardant: Fyrol PCF (Akzo) | 14.3 |

-continued

| A side: Polyisocyanate PAPI 580 (Dow Chemical) B side: Formulation + Blowing agent | |
|---|---|
| Water | 0.5 |
| Surfactant: Tegostab B-84PI (Goldschmidt) | 1.6 |
| Catalyst: Hex. Chem 977 (Mooney Chemical) | 1.5 |
| Catalyst: Polycat 4 (Air Products) | 0.5 |
| Catalyst: PM-DETA (Huntsman Petrochemical) | 0.5 |
| TOTAL: | 100.0 |

| B-Side # | Blowing Agent |
|---|---|
| 2 | 30% Cyclopentane |
| 3 | 26% 141B |
| 4 | 30% 134 |
| 5 | 18% Isopentane + 11% 152A |
| 6 | 17% Cyclopentane + 12% Isopentane + 8% 152A |

TABLE VII

Flammability and Other Test Results

| Ex. | 12 | 13 | 14 | 15* | 16 | 17 | 18* | 19 | 20** |
|---|---|---|---|---|---|---|---|---|---|
| B-side # | 3 | 2 | 2 | | 5 | 6 | | 4 | |
| Blowing Agent | | | | | | | | | |
| HFC- | 141b | — | — | 152a | 152a | 152a | 134a | 134 | 143 |
| Iso-pentane | — | — | — | — | yes | yes | — | — | — |
| Cyclo pentane | — | yes | yes | — | — | yes | — | — | — |
| Index | 2.5 | 2.5 | 3.0 | 2.5 | 2.5 | 2.5 | 2.5 | 2.5 | 2.5 |
| Panel OD (in.) | 2.27 | 2.30 | 2.30 | | 2.30 | 2.30 | | 2.22 | |
| Core Density (from compressive strength) | 2.03 | 2.12 | 2.00 | | 2.28 | 2.15 | | 2.07 | |
| Average PCF E-84 (Core. 2") | | | | | | | | | |
| Flame spread | 30 | 45 | 45 | | 35 | 40 | | 20 | |
| Smoke | 50 | 70 | 55 | | 45 | 85 | | 45 | |
| K-factor (75° F.) | | | | | | | | | |
| Initial | 0.133 | 0.157 | 0.151 | | 0.146 | No K | | 0.155 | |
| After 7 days | | 0.169 | | | | | | | |
| Closed Cell, % | 91.2 | 85.2 | 90 | | 91 | 90.3 | | 81.9 | |
| Core Comp. Strength | | | | | | | | | |
| Thickness, Av. PSI | 26.3 | 22.7 | 23.7 | | 23.0 | 22.1 | | 17.4 | |
| Width, Av. PSI | 19.6 | 26.6 | 14.0 | | 23.2 | 45.2 | | 25.5 | |
| Length, Av. PSI | 16.4 | 21.3 | 18.7 | | 23.1 | 25.0 | | 14.9 | |
| Dimensional Stab. Volume Change | | | | | | | | | |
| H.A. 158° F., 95% RH, 28 day | 4.38 | 5.90 | 3.27 | | 1.03 | 1.00 | | 4.73 | |
| D.H. 158° F., 28 day Av. | 0.73 | 2.06 | 0.52 | | −1.03 | −2.22 | | −0.10 | |
| D.H. 200° F., 28 day Av. | 0.78 | 2.43 | 2.81 | | −1.85 | −2.67 | | 0.67 | |
| Freezer −20° F., 14 day Av. | −1.52 | −2.41 | −1.38 | | −1.16 | −2.30 | | −1.62 | |

*Due to poor solubility of the blowing agent, no samples were obtained.
**No blowing agent; no samples were obtained.

TABLE VIII

Elasticity and Strength Test Results

| Ex. | 12 | 13 | 14 | 15* | 16 | 17 | 18* | 19 | 20** |
|---|---|---|---|---|---|---|---|---|---|
| B-side # | 3 | 2 | 2 | | 5 | 6 | | 4 | |
| Blowing Agent | | | | | | | | | |
| HFC- | 141b | — | — | 152a | 152a | 152a | 134a | 134 | 143 |
| Iso-pentane | — | — | — | — | yes | yes | — | — | — |
| Cyclo-pentane | — | yes | yes | — | — | yes | — | — | — |
| From Comp. St. Av. Modulus of Elasticity, PSI | 443 | 459 | 461 | | 528 | 503 | | 401 | |
| Av. Shear Strength | | | | | | | | | |
| yield, psi | 18.7 | no | 20.5 | | 29.1 | 31.1 | | 18.6 | |
| failure, psi | 23.2 | data | 24.1 | | 33.1 | 36.1 | | 21.3 | |
| modulus of Elas., | 192 | | 337 | | 272 | 313 | | 200 | |

TABLE VIII-continued

Elasticity and Strength Test Results

| Ex. | 12 | 13 | 14 | 15* | 16 | 17 | 18* | 19 | 20** |
|---|---|---|---|---|---|---|---|---|---|
| psi Av. Tensile Strength | | | | | | | | | |
| tensile, psi | 30.8 | 24.4 | 28.4 | | 23.8 | 40.2 | | 25 | |
| modulus of Elas., psi | 659 | 631 | 747 | | 703 | 845 | | 436 | |

*Due to poor solubility of the blowing agent, no samples were obtained.
**No blowing agent, no samples were obtained.

TABLE IX

Cone Calorimeter Data: Heat Flux at 25 kW/m²

| Ex. | Thermax U-4616 | 12 | 13 | 14 | 16 | 17 | 19 |
|---|---|---|---|---|---|---|---|
| B-side # | | 3 | 2 | 2 | 5 | 6 | 4 |
| Blowing Agent | | | | | | | |
| HFC- | — | 141b | — | — | 152a | 152a | 134 |
| Iso-pentane | — | — | — | — | yes | yes | — |
| Cyclo-pentane | — | — | yes | yes | — | yes | — |
| Time to ignition, sec. | 7 | 8 | 6 | 6 | 6 | 6 | 6 |
| Time to flame out, sec. | 21 | 22 | 39 | 38 | 39 | 52 | 38 |
| Sample Mass | 14.4 | 14.9 | 13.2 | 14.8 | 19.0 | 17.3 | 19.2 |
| Original Mass. g | | | | | | | |
| at ignition, g | 14.1 | 14.6 | 12.8 | 14.5 | 18.6 | 16.9 | 18.7 |
| at flame out, g | 13.7 | 14.3 | 12.1 | 13.9 | 17.9 | 15.5 | 18.0 |
| at 240 sec, g | 12.4 | 13.1 | 11.0 | 13.1 | 17 | 14.5 | 16.8 |
| at 480 sec, g | 11.5 | — | — | — | — | — | — |
| Peak Heat Release Rate 25 kW/m² | 48.7 | 56.4 | 89.4 | 85.8 | 89.7 | 106.8 | 86.4 |
| Time to Peak Heat Release Rate, sec. | 13 | 13 | 14 | 13 | 13 | 14 | 13 |
| Accumulated Heat at Flame Out, kJ | 5.0 | 6.1 | 17.5 | 17.1 | 16.4 | 30.2 | 16.3 |
| 240 sec kJ | 10.0 | 12.2 | 31.7 | 29.5 | 22.8 | 38.9 | 37.8 |
| 480 sec kJ | 12.7 | — | — | — | — | — | — |
| Accumulated Smoke at Flame Out, m² | 0.24 | 0.28 | 0.33 | 0.29 | 0.36 | 0.57 | 0.34 |
| 240 sec m² | 0.46 | 0.34 | 0.34 | 0.37 | 0.53 | 0.62 | 0.35 |
| 480 sec m² | 0.49 | — | — | — | — | — | — |

Note: Due to no data, information for Examples 15, 18 and 20 is omitted.

Demand Influences

The key buying influence for metal structural panels remains economics. For example, a typical, conventional metal panel sells for $1.10 per square foot to the builder/erector. Panel prices can vary as high as $1.25 to $1.35 per square foot depending on panel width and metal thickness. A typical R-10 fiberglass insulation (3") together with vapor barrier will cost approximately $0.25 per square foot. In addition, fiberglass installation costs will range from about $0.15 to about $0.18/ft².

Factors further affecting economics include building code requirements. Along high wind exposure coastal areas, the ASTM 1592 wind up-lift test is gaining increased importance. Standing seam metal roofing systems have historically done poorly under high wind conditions. The industry has moved to adopt a modified version of the U.S. Army Corps of Engineers' wind up-lift test method. This new ASTM 1592 test has placed additional requirements on the system. As demonstrated, the inventive panels of Examples 3 and 4 performed well in this test; please see Table I. The modifications include the reduction of panel widths, the increase of metal thickness, and/or the modification of seaming methods, which can add anywhere from $0.05 to about $0.20 per square foot to the cost of the panel.

On the insulation side, condensation performance has become an essential design consideration in climates where the January mean temperature is −1° C. or less. In fact, over 60% of all metal installations are in these type climatic environments. Additionally, "installed R-value" as contrasted with "design R-value" has become the operative term. This is not surprising given the 40% R-value loss typically associated with fiberglass compression at purlins or girts. The use of thermal break at this interface will improve performance; however, a shift to double layer systems or THERMAX™ iso-board is becoming increasingly more popular. More specifiers are taking note of the economic benefit of THERMAX versus double layer fiberglass systems.

From the point of view of a builder or erector, a vital issue facing the construction trades remains workman's compensation costs. On average, these costs account for about 30% of labor or 4% of total installation costs. Combined with an increased need for safety training, which is OSHA mandated, employers are keenly interested in building systems that require less labor on installation. Builders have indicated a preference for value-engineered building systems that compete on a total cost basis.

It is anticipated that the poured-in-place sandwich panels of the instant invention has the greatest growth potential in the metal building industry. Key product features may include, in one non-limiting embodiment of the invention, fiberglass reinforcement, interior side vapor barriers, i.e. interior facers 18, foam edge detail, and aesthetics. Preliminary estimates forecast the market for the poured-in-place metal sandwich panel 10 of this invention at about 250 million square feet.

The interior facer 18 of the present invention takes into account long-term adhesion, interior aesthetics, and structural considerations—where fiberglass in the planar, rigid, cellular polyisocyanurate foam core 12 is preferred. The design of the foam edge detail will remain an integral part of the vapor barrier to assure thermal efficiency. Further, the panels 10 of this invention may employ a standing seam profile. To the contrary, design constraints for existing, conventional sandwich panel technology limit joint assemblies. These product features assist marketability of the sandwich panels 10, but a reduction in foam density is also anticipated, which has practical and economic effects.

Many modifications may be made in the structures and processes of this invention without departing from the spirit and scope thereof which are defined only in the appended claims. For example, one skilled in the art may discover that a certain combination of components, i.e. a particular polyisocyanurate foam core 12, interior facer 18, metal skin 20, primer layer 22, and/or glass fibers may give a sandwich panel with certain advantages. Further, certain dimensions or designs other than those disclosed here would be produced for a particular installation, but panels of these designs or dimensions would nevertheless fall within the scope of the claims, may prove advantageous.

In another important embodiment, the poured-in-place sandwich panel invention could be practiced with a polyurethane foam core, with glass fibers in the foam core, and an interior metal facer and an exterior metal skin.

I claim:

1. A poured-in-place sandwich panel comprising:
   a planar, rigid, cellular polyisocyanurate or polyurethane foam core, the core containing glass fibers, where the foam density, without including glass fibers, ranges from about 1.6 to about 2.4 lbs/ft$^3$;
   an interior facer on a first side of said polyisocyanurate or polyurethane foam core; and
   a metal skin on a second side of said polyisocyanurate or polyurethane foam core
   where the poured-in-place sandwich panel has at least one improved flammability characteristic without an increase in crossbow as compared with a poured-in-place sandwich panel identical thereto except containing no glass fibers.

2. The poured-in-place sandwich panel of claim 1 further comprising a primer layer between the metal skin and said polyisocyanurate or polyurethane foam core to improve adhesion therebetween.

3. The poured-in-place sandwich panel of claim 2 in which the primer layer is selected from the group consisting of polyurea, polyepoxide, and polyacrylic.

4. The poured-in-place sandwich panel of claim 1 wherein:
   the planar, rigid, cellular polyisocyanurate or polyurethane foam core ranges in thickness from about 0.5 to about 8 inches;
   the interior facer ranges in thickness from about 0.9 to about 18 mils; and
   the metal skin ranges in thickness from about 20 to about 28 gauge.

5. The poured-in-place sandwich panel of claim 1 where the interior facer is metal and has a thickness ranging from about 18 to about 15 mils.

6. The poured-in-place sandwich panel of claim 1 where the interior facer is non-flammable, and is selected from the group consisting of asbestos, glass fibers, polyester vinyl, polypropylene, elastomers, metals, metallized polymer sheets, fire retardant papers, metal foil, cellulosic lamina, and composites thereof.

7. The poured-in-place sandwich panel of claim 1 in which the interior facer is thinner and more flexible than the metal skin.

8. The poured-in-place sandwich panel of claim 1 where the glass fibers are glass fibers ranging from ¾" to 6" in length injected into a foam-forming mixture prior to the forming of the planar, rigid, cellular foam core.

9. The poured-in-place sandwich panel of claim 8 where the glass fibers are uniformly distributed in the foam core.

10. A poured-in-place sandwich panel comprising:
    a planar, rigid, cellular polyisocyanurate or polyurethane foam core containing glass fibers, where the planar, rigid, cellular polyisocyanurate foam core has a thickness from about 0.5 to about 8 inches, and where the foam density, without including glass fibers, ranges from about 1.6 to about 2.4 lbs/ft$^3$;
    an interior facer on a first side of said polyisocyanurate or polyurethane foam core, the interior facer having a thickness from about 0.9 to about 18 mils;
    a metal skin on a second side of said polyisocyanurate or polyurethane foam core, the metal skin having a thickness from about 20 to about 28 gauge; and
    a primer layer between the metal skin and said polyisocyanurate or polyurethane foam core to improve adhesion therebetween where the poured-in-place sandwich panel has at least one improved flammability characteristic without an increase in crossbow as compared with a poured-in-place sandwich panel identical thereto except containing no glass fibers.

11. The poured-in-place sandwich panel of claim 10 in which the primer layer is selected from the group consisting of polyurea, polyepoxide, and polyacrylic.

12. A process for producing a poured-in-place sandwich panel comprising:
    providing a metal skin;
    providing an interior facer within close proximity of and parallel to the metal skin;
    contacting the metal skin and the interior facer with a rigid, cellular polyisocyanurate foam-forming mixture or polyurethane foam-forming mixture therebetween; and
    providing glass fibers in the polyisocyanurate or polyurethane foam-forming mixture
    where the resulting poured-in-place sandwich panel has a foam core with a foam density, without including glass fibers, ranging from about 1.6 to about 2.4 lbs/ft$^3$ and at least one improved flammability characteristic without an increase in crossbow as compared with a poured-in-place sandwich panel identical thereto except containing no glass fibers.

13. The process of claim 12 further comprising:
forming the planar, rigid, cellular polyisocyanurate or polyurethane foam core to have a thickness from about 0.5 to about 8 inches;
providing an interior facer having a thickness from about 0.9 to about 18 mils; and
providing a metal skin having a thickness from about 20 to about 28 gauge.

14. The process of claim 12 further comprising providing a primer layer between the metal skin and the foam-forming mixture, which primer layer is selected from the group consisting of polyurea, polyepoxide, and polyacrylic.

15. The process of claim 12 where providing the glass fibers in the foam-forming mixture comprises injecting glass fibers ranging from ¾ to 6" in length into the foam-forming mixture.

* * * * *